(12) United States Patent
Miyamoto et al.

(10) Patent No.: US 10,027,829 B2
(45) Date of Patent: *Jul. 17, 2018

(54) RECORDING APPARATUS AND READING APPARATUS

(71) Applicant: SEIKO EPSON CORPORATION, Tokyo (JP)

(72) Inventors: Shintaro Miyamoto, Shiojiri (JP); Yoshiyuki Okazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,577

(22) Filed: Feb. 15, 2017

(65) Prior Publication Data

US 2017/0251116 A1    Aug. 31, 2017

(30) Foreign Application Priority Data

Feb. 26, 2016    (JP) .................................. 2016-035166

(51) Int. Cl.
| | |
|---|---|
| *H04N 1/00* | (2006.01) |
| *B41J 2/01* | (2006.01) |
| *B41J 29/38* | (2006.01) |
| *H04N 1/10* | (2006.01) |
| *B41J 29/02* | (2006.01) |
| *B41J 29/13* | (2006.01) |

(52) U.S. Cl.
CPC ............ *H04N 1/00535* (2013.01); *B41J 2/01* (2013.01); *B41J 29/02* (2013.01); *B41J 29/13* (2013.01); *B41J 29/38* (2013.01); *H04N 1/00543* (2013.01); *H04N 1/00554* (2013.01); *H04N 1/1026* (2013.01); *H04N 2201/0094* (2013.01); *H04N 2201/0446* (2013.01)

(58) Field of Classification Search
CPC .......... H04N 1/00535; H04N 1/00554; H04N 1/1026; H04N 1/00543; H04N 2201/0094; H04N 2201/0446; B41J 29/02; B41J 29/13; B41J 29/38; B41J 2/01

See application file for complete search history.

(56) References Cited

U.S. PATENT DOCUMENTS

2017/0251115 A1*  8/2017  Miyamoto ......... H04N 1/00525

FOREIGN PATENT DOCUMENTS

| JP | 11-215320 A | 8/1999 |
|---|---|---|
| JP | 2003-078682 A | 3/2003 |
| JP | 2017153003 A | 8/2017 |

* cited by examiner

*Primary Examiner* — Henok Legesse
(74) *Attorney, Agent, or Firm* — Workman Nydegger

(57) ABSTRACT

An apparatus main body including a recording mechanism portion that performs recording on a paper sheet; and a reading mechanism portion which is linked to the apparatus main body to be rotatable in an upper portion of the apparatus main body, and reads a document, the reading mechanism portion includes a reading unit which extends in a main scanning direction, and moves in an auxiliary scanning direction intersecting with the main scanning direction, a motor which moves the reading unit, and a first linking portion and a second linking portion which are disposed on the outside of a moving region when the moving region of the reading unit is viewed in a plan view, and are linked to the apparatus main body to be rotatable, and the motor is disposed at least in any of the first linking portion and the second linking portion.

10 Claims, 17 Drawing Sheets

RECORDING APPARATUS AND READING APPARATUS

BACKGROUND

1. Technical Field

The present invention relates to a recording apparatus which includes a recording mechanism portion that performs recording on a recording medium, and a reading mechanism portion that reads a document, and to a reading apparatus which reads the document.

2. Related Art

In a recording apparatus which performs recording on a recording medium, a configuration in which a recording mechanism portion that performs the recording on the recording medium and a reading mechanism portion that reads a document are integrally provided, is employed.

However, in a moving mechanism of a reading unit in a flat-bed type reading mechanism (scanner), there is a type in which the reading unit is fixed to a timing belt wound around a driving pulley that rotates by a driving source and a driven pulley that is rotated to be driven by the driving pulley, the driving pulley is rotated, the timing belt is moved, and the reading unit is attracted.

In JP-A-11-215320, a timing belt stretches to a driving pulley and a driven pulley which are provided at both ends in the moving direction of a reading unit.

In JP-A-2003-78682, a driving pulley and a driving source thereof are disposed on the outside of an apparatus, and two driven pulleys which are provided at both ends in the moving direction of the reading unit and a timing belt in the driving pulley, stretch.

In the recording apparatus including the recording mechanism portion and the reading mechanism portion, in order to perform maintenance (for example, exchange of an ink cartridge) of the recording mechanism portion, there is a case where the reading mechanism portion is openable and closable with respect to the recording mechanism portion.

In the image reading apparatus according to the above-described JP-A-11-215320 and the image forming apparatus according to JP-A-2003-78682, relevance when opening and closing the reading mechanism portion with respect to the recording mechanism portion was not particularly considered. Additionally, in recent years, there also has been a request for further reducing the size of the apparatus.

SUMMARY

An advantage of some aspects of the invention is to realize at least any of easier opening and closing of a reading mechanism portion or further reduction of the size, in a recording apparatus integrally including a recording mechanism portion that performs recording on a recording medium, and a reading mechanism portion that reads a document.

According to an aspect of the invention, there is provided a recording apparatus including: an apparatus main body including a recording mechanism portion provided with a recording unit that performs recording on a recording medium; and a reading mechanism portion which is linked to the apparatus main body to be rotatable in an upper portion of the apparatus main body, opens and closes the upper portion of the apparatus main body by rotating, and reads a document, in which the reading mechanism portion includes a reading unit which extends in a main scanning direction, and moves in an auxiliary scanning direction intersecting with the main scanning direction, a motor of the reading unit, and a first linking portion and a second linking portion which are disposed on the outside of a moving region when the moving region of the reading unit is viewed in a plan view, and are linked to the apparatus main body to be rotatable, and in which the motor is disposed at least in any of the first linking portion and the second linking portion.

There are many cases where a power source of the reading unit in the reading mechanism portion is a heavy object, such as a motor, but according to the aspect, since such as heavy object is disposed in the vicinity of a linking portion of the reading mechanism portion, that is, a rotation shaft, it is possible to open the reading mechanism portion by a small force when opening the reading mechanism portion, and to suppress damage of the reading mechanism portion or the apparatus main body since inertia is also small when closing the reading mechanism portion.

Furthermore, in a case where a so-called free-stop mechanism which holds the reading mechanism portion by a predetermined opening angle is provided, it is possible to hold the reading mechanism portion by a small force, and to achieve low costs or light weight of the free-stop mechanism.

Additionally, since the motor is disposed in the first linking portion and the second linking portion which are disposed on the outside of the moving region when the moving region of the reading unit is viewed in a plan view, and are linked to the apparatus main body to be rotatable, that is, the motor is disposed by using a configuration part that is capable of rotating the reading mechanism portion via the rotation shaft, it is possible to achieve reduction of the size of the apparatus.

In the recording apparatus, the first linking portion and the second linking portion may be formed in a housing having the rotation shaft, and the motor may be provided on the inside of the housing at least in any of the first linking portion and the second linking portion. In addition, in the recording apparatus, at least a part of a carriage provided with the recording unit and at least a part of the motor may overlap each other in an apparatus height direction.

According to the aspect, since the motor is disposed on the inside of the first linking portion and the second linking portion which are linked to the apparatus main body to be rotatable, that is, the motor is disposed by using a configuration part for making it possible to rotate the reading mechanism portion via the rotation shaft, it is possible to achieve reduction of the size of the apparatus. In addition, since at least a part of the carriage provided with the recording unit and at least a part of the motor overlap each other in the apparatus height direction, it is possible to suppress a dimension in the height direction in the recording apparatus.

In the recording apparatus, the power source may be disposed at a position which crosses a rotation shaft line of the rotation shaft of the reading mechanism portion. In addition, in the recording apparatus, a detector which detects a position of the reading unit, may be provided, a relay substrate which connects a cable from the detector and a cable from the motor with each other, may be provided, and the relay substrate may be disposed at least in any of the first linking portion and the second linking portion.

According to the aspect, since motor is disposed at a position which crosses a rotation shaft line of the reading mechanism portion, it is possible to open the rotating reading mechanism portion by a smaller force. In addition, when closing the reading mechanism portion, it is possible to reduce a concern about damage of the reading mechanism portion or the recording mechanism portion since the inertia becomes smaller. Furthermore, since the relay substrate is disposed at least in any of the first linking portion and the second linking portion, it is possible to suppress an increase in size of the apparatus.

In the recording apparatus, the apparatus main body may have a set port which sets a recording medium in the upper portion thereof, and the first linking portion and the second linking portion may be disposed to avoid the set port.

In the aspect, since the apparatus main body has the set port which sets the recording medium in the upper portion thereof, it is necessary for the reading mechanism portion provided in the upper portion of the apparatus main body to avoid the set port. According to the aspect, since the first linking portion and the second linking portion are disposed to avoid the set portion, it is possible to effectively use a space around the set port, and to suppress an increase in size of the apparatus when the apparatus is viewed in a plan view.

In the recording apparatus, the set port may be disposed on the outside in the main scanning direction, with respect to the moving region, the first linking portion and the second linking portion may be disposed to nip the set port in the auxiliary scanning direction, and the rectangular housing outline may be configured of the moving region, the first linking portion, the second linking portion, and the set port when the moving region is viewed in a plan view.

According to the aspect, since the rectangular housing outline is configured of the moving region, the first linking portion, the second linking portion, and the set port when the moving region is viewed in a plan view, it is possible to make a compact and excellent appearance.

In the recording apparatus, the reading mechanism portion may include an endless belt which is engaged and rotates between a driving pulley which is driven by the motor and a driven pulley which is rotatably driven, and attracts the reading unit, and a guide portion which guides the reading unit in the auxiliary scanning direction, and the driven pulley may be disposed in the vicinity of an end portion on one side of the guide portion and in the vicinity of an end portion on the other side.

According to the aspect, since it is possible to provide the endless belt which attracts the reading unit in the vicinity of the guide portion, it is possible to smoothly move the reading unit.

In the recording apparatus, a cable which electrically connects the recording mechanism portion and the reading mechanism portion, may be provided, the cable may extend from at least one of the first linking portion and the second linking portion which are provided with the motor, and enter the inside of the recording mechanism portion, and a substrate to which the cable is connected in the apparatus main body that configures the recording mechanism portion, may be disposed on a side surface on a side near the first linking portion or the second linking portion which is provided with the motor.

According to the aspect, it is possible to shorten the length of the cable which electrically connects the recording mechanism portion and the reading mechanism portion. In addition, it is possible to easily connect the cable to the substrate.

According to another aspect of the invention, there is provided a reading apparatus including: a reading mechanism portion which has a loading surface that reads a document; and an opening and closing body which is linked to the reading mechanism portion to be rotatable, and opens and closes an upper portion of the loading surface by rotating, in which the reading mechanism portion includes a reading unit which extends in a main scanning direction, and moves in an auxiliary scanning direction intersecting with the main scanning direction, a motor of the reading unit, and a first linking portion and a second linking portion which are disposed on the outside of a moving region when the moving region of the reading unit is viewed in a plan view, and are linked to the opening and closing body to be rotatable, and in which the motor is disposed at least in any of the first linking portion and the second linking portion.

According to the aspect, in the reading apparatus main body, since the motor is disposed at least in any of the first linking portion and the second linking portion which are disposed on the outside of the moving region when the moving region of the reading unit is viewed in a plan view, and are linked to the opening and closing body to be rotatable, that is, the motor is disposed by using the configuration part for making it possible to rotate the opening and closing body, it is possible to achieve reduction of the size of the apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Example 1

First, an overview of a recording apparatus according to one example of the invention will be described. In the example, an example of the recording apparatus includes an ink jet type printer (hereinafter, simply referred to as a printer).

Figure 1:
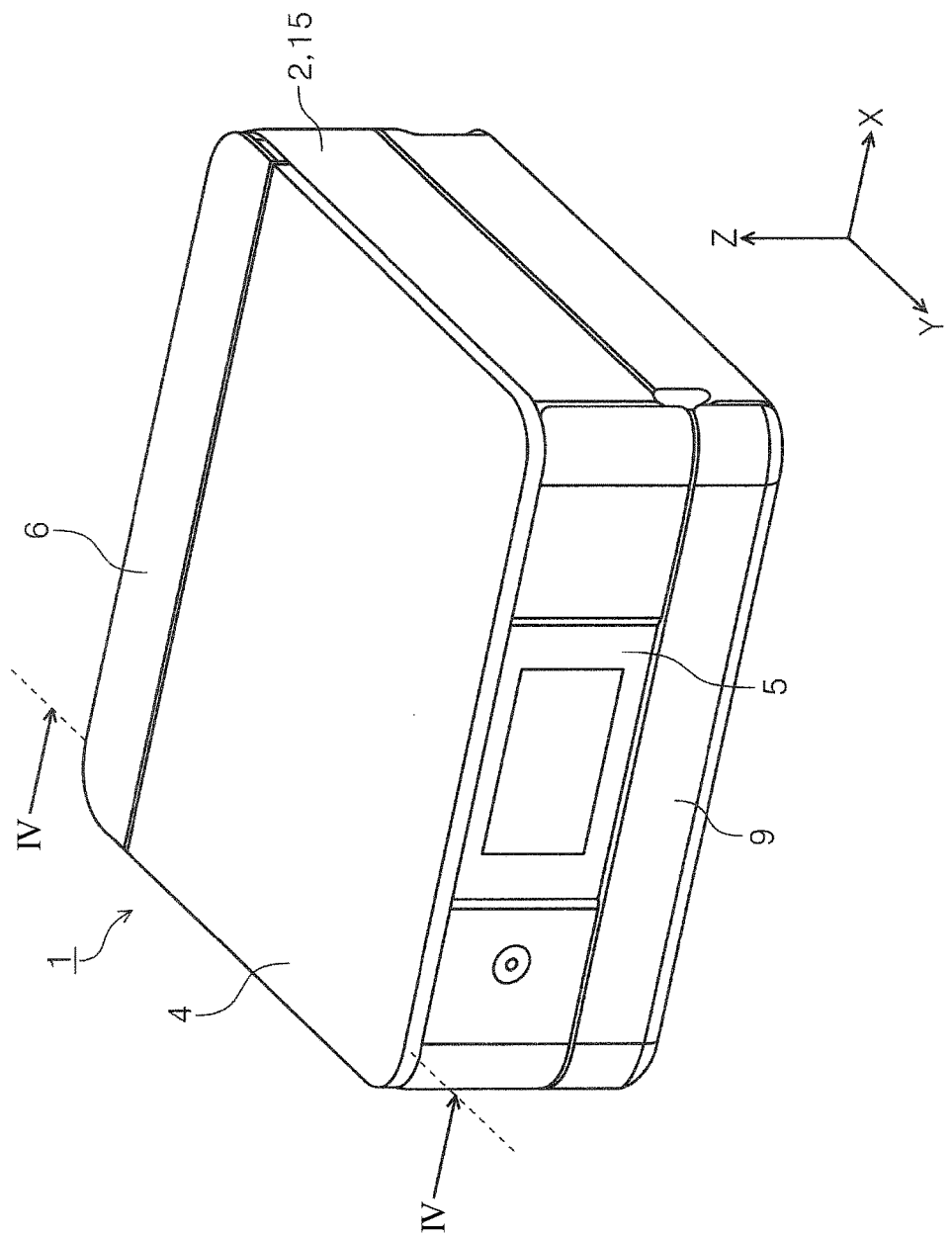
FIG. 1 is an external perspective view of a printer according to the invention.
Figure 2:
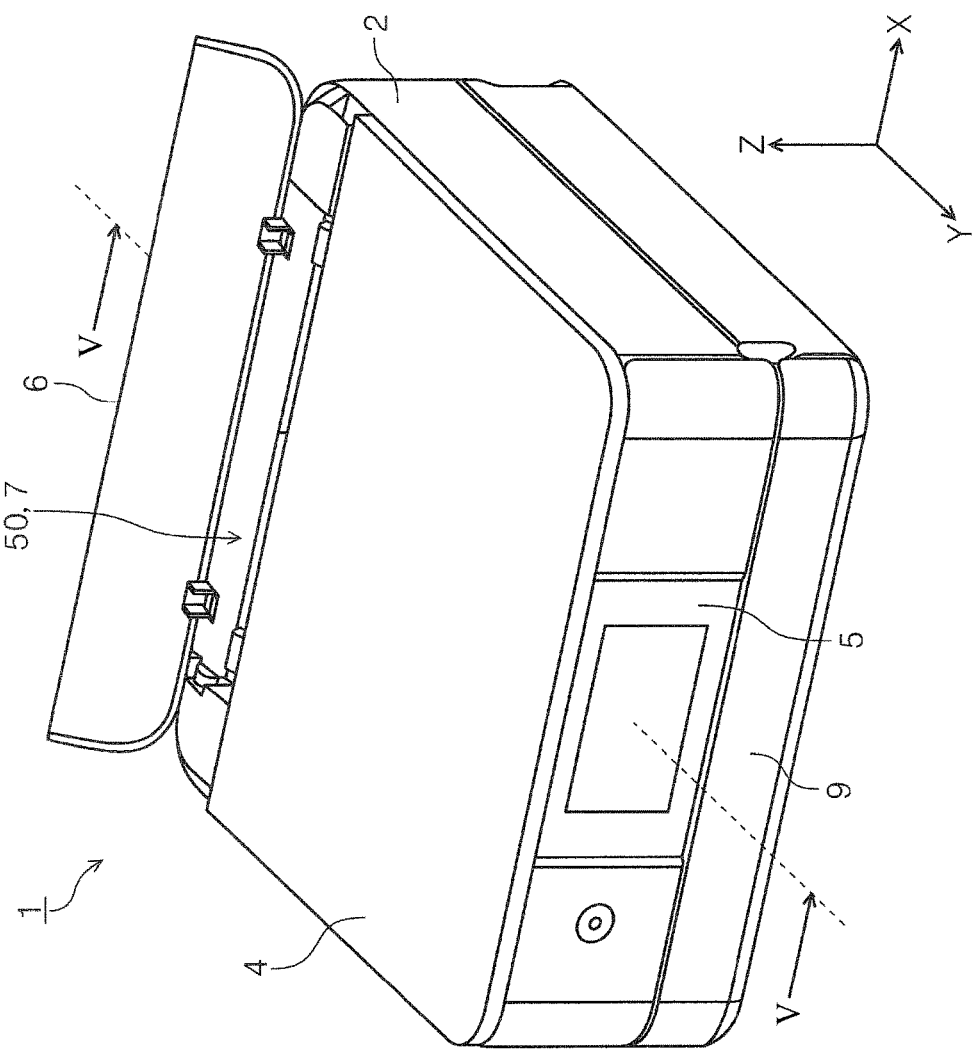
FIG. 2 is a perspective view illustrating a state where a manual feed cover is open in the printer according to the invention.
Figure 3:
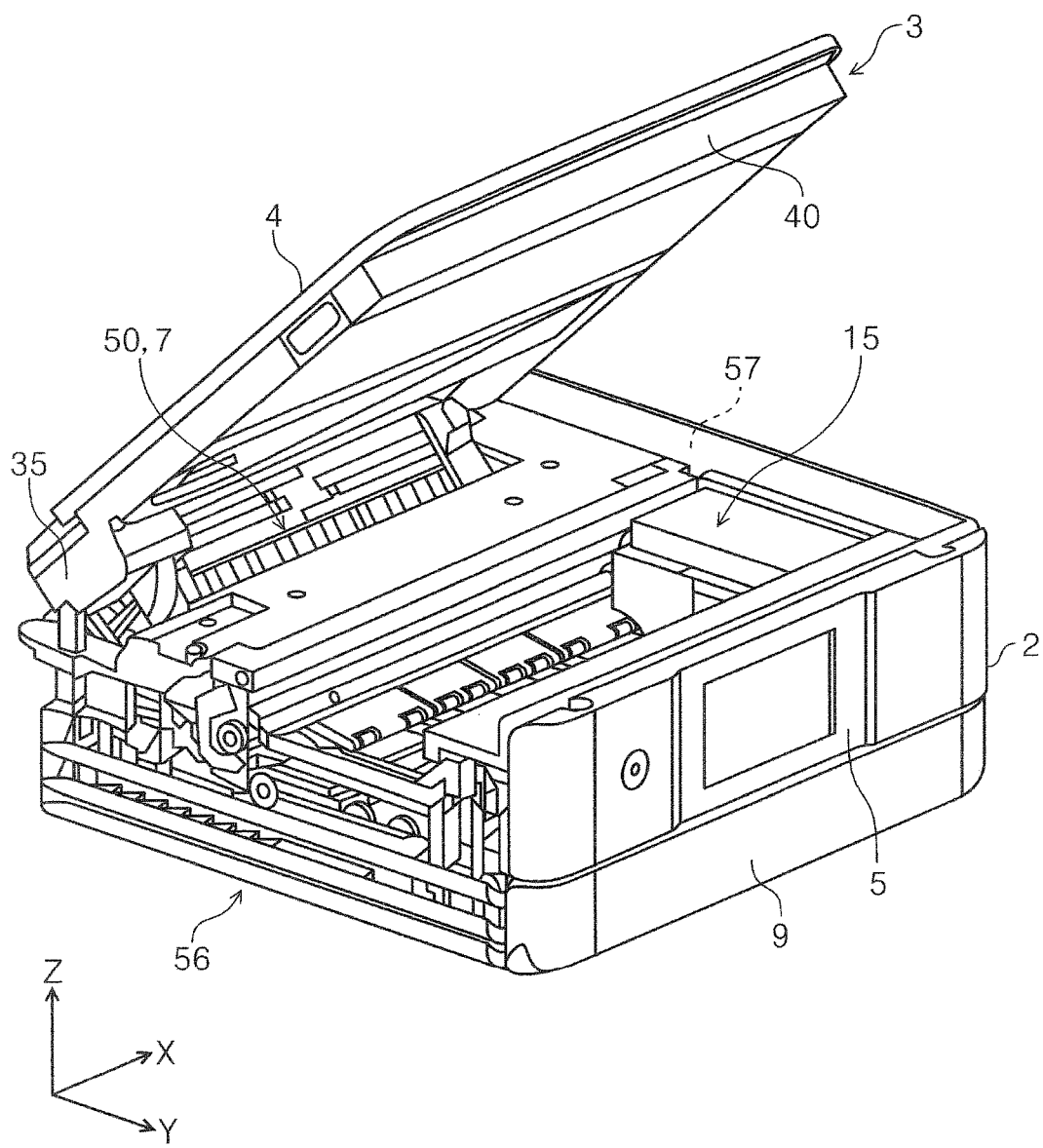
FIG. 3 is a perspective view illustrating a state where a reading mechanism portion is open in the printer according to the invention.
Figure 4:
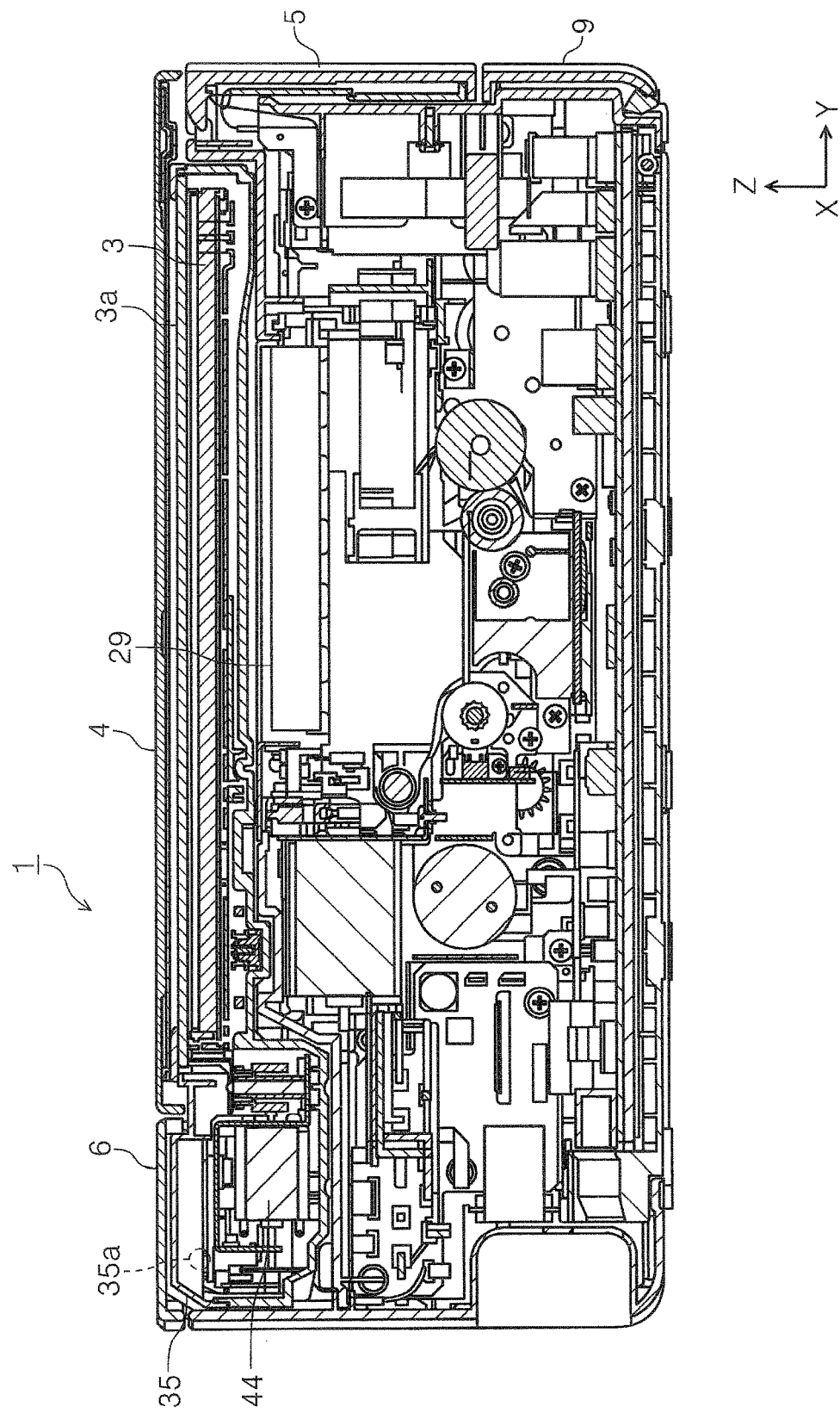
FIG. 4 is a sectional view taken along an arrow IV-IV of FIG. 1.
Figure 5:
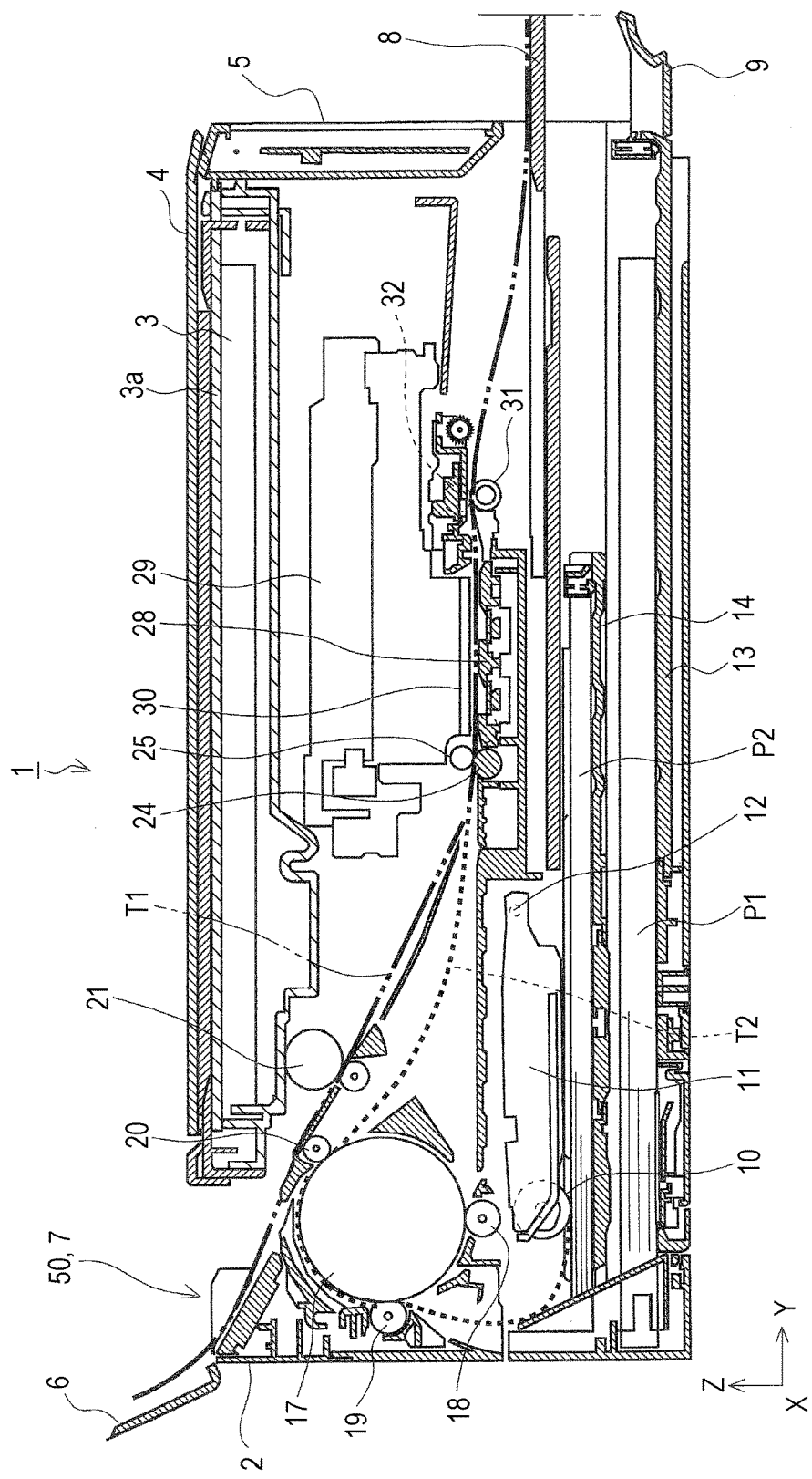
FIG. 5 is a sectional view taken along an arrow V-V of FIG. 2.
Figure 6:
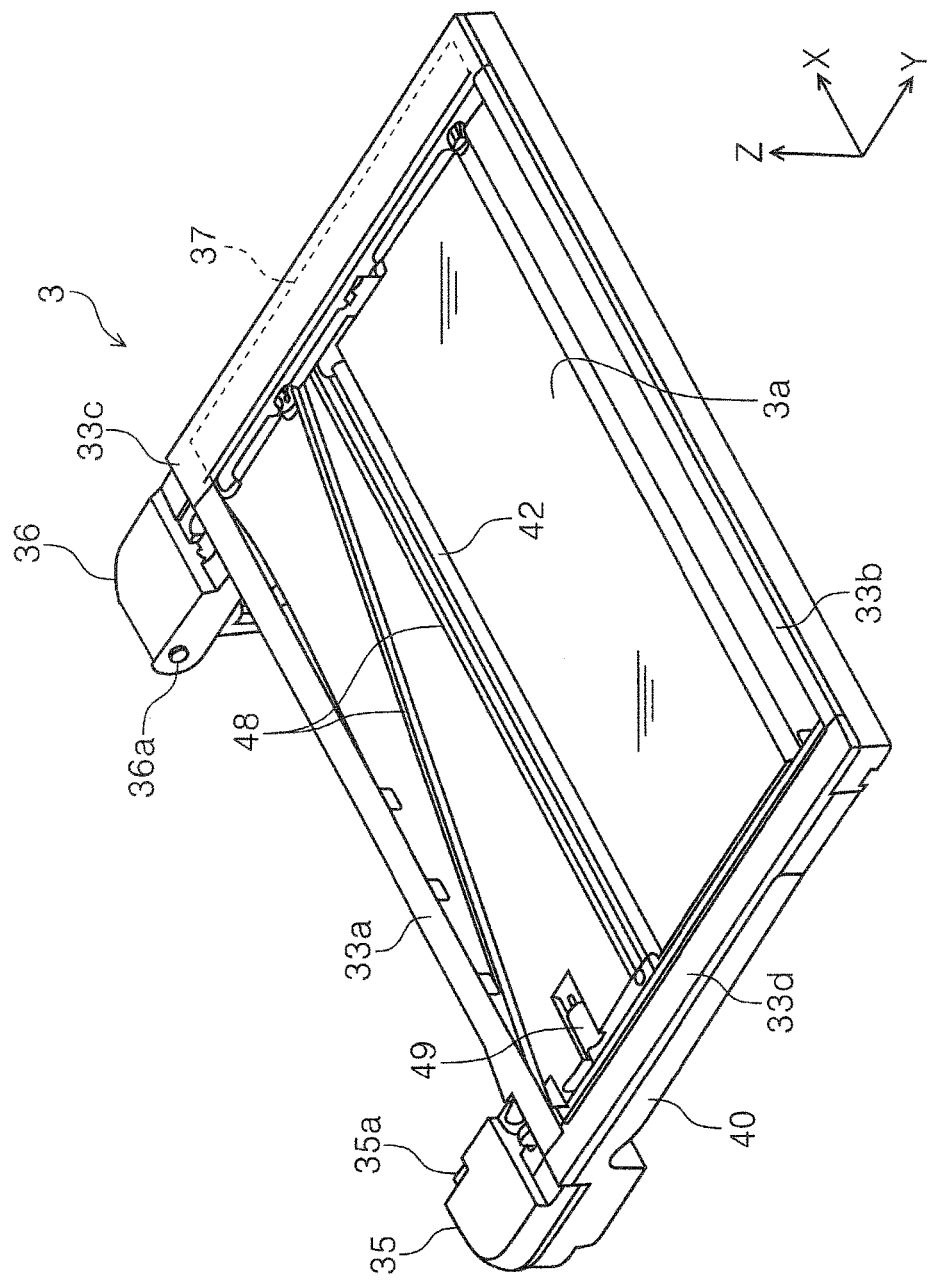
FIG. 6 is a perspective view of the reading mechanism portion.
Figure 7:
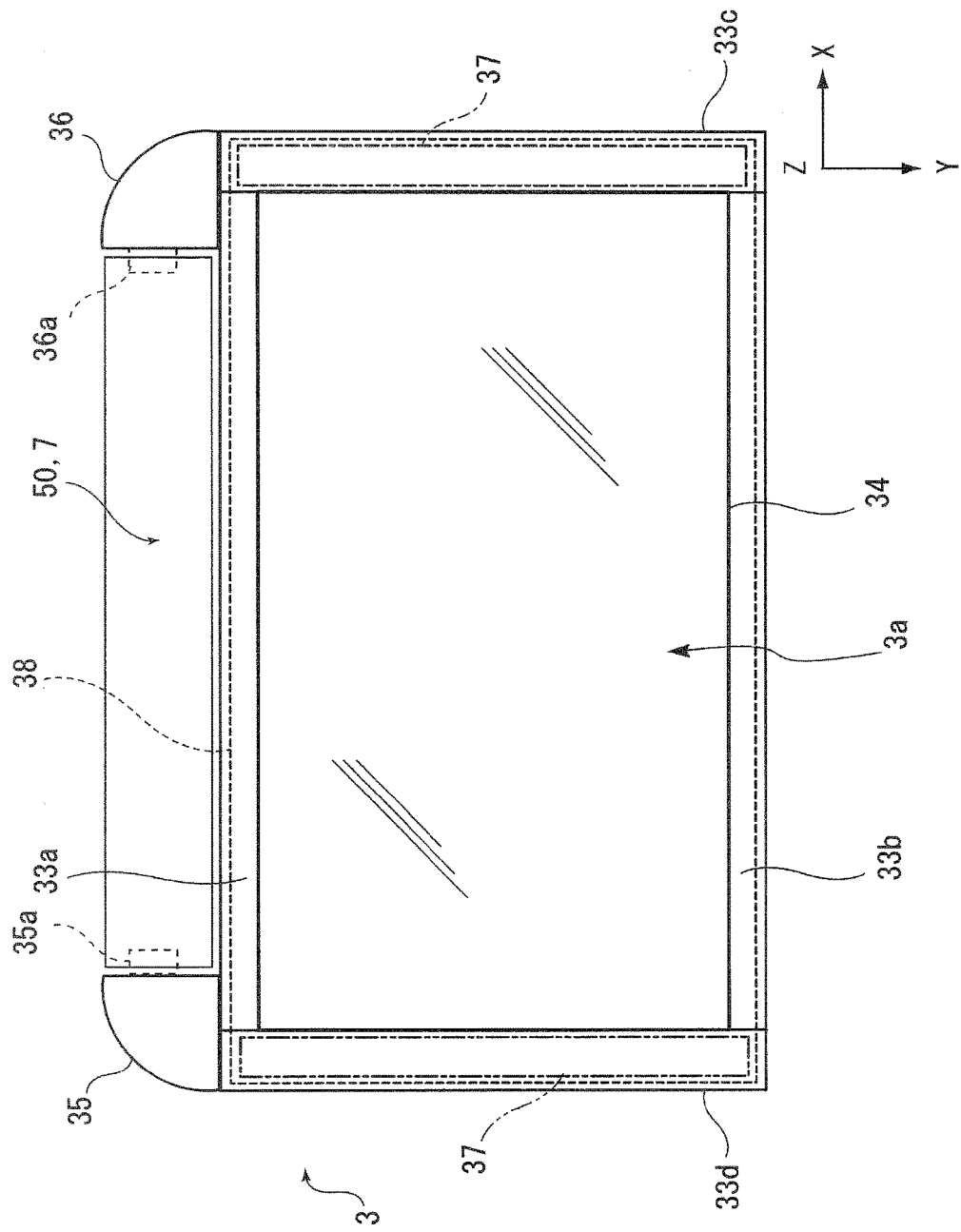
FIG. 7 is a plan view of the reading mechanism portion.
Figure 8:
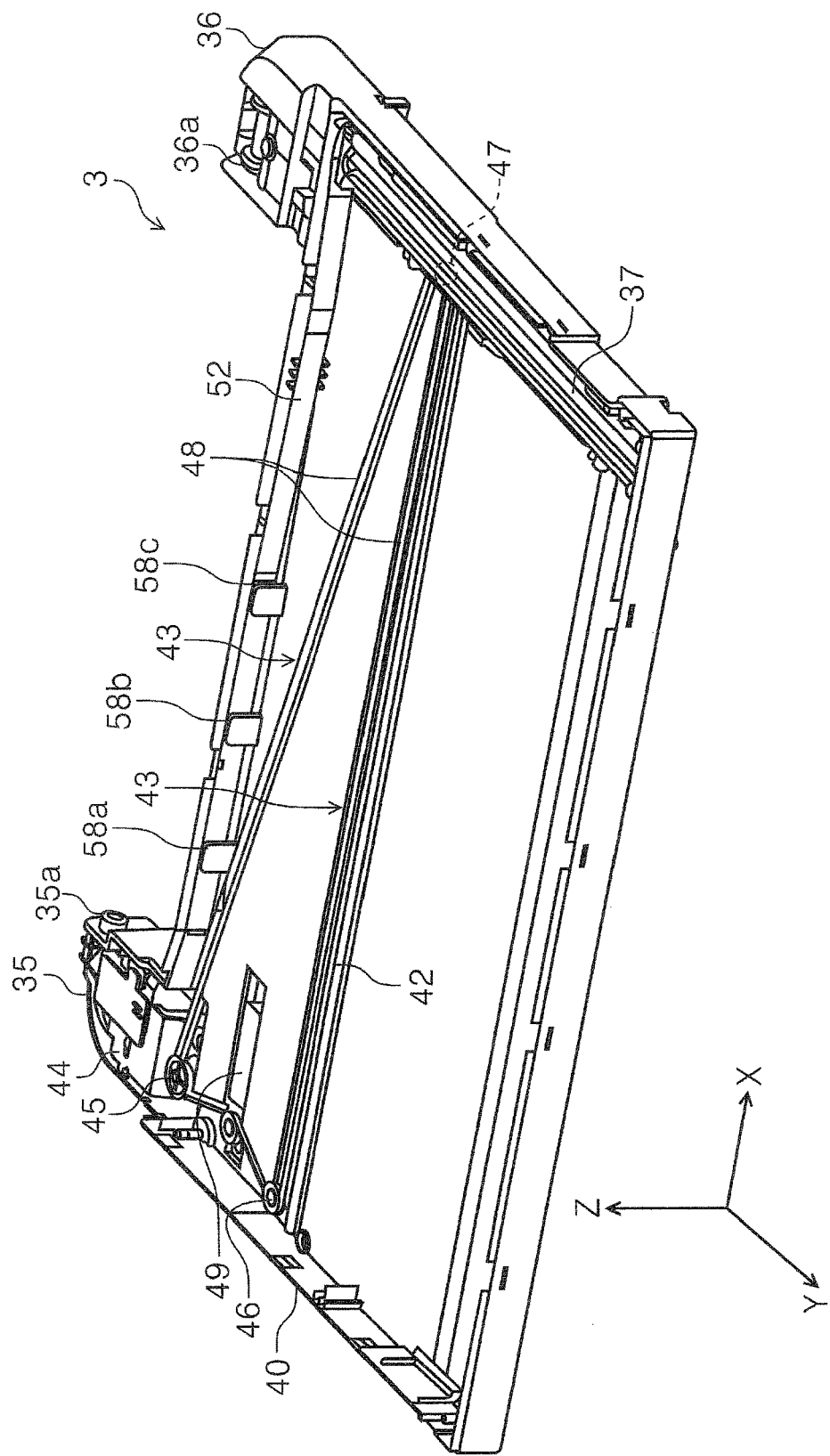
FIG. 8 is a perspective view illustrating a state where a document stand is removed in the reading mechanism portion.

FIG. 1 is an external perspective view of the printer according to the invention. FIG. 2 is a perspective view illustrating a state where a manual feed cover is open in the printer according to the invention. FIG. 3 is a perspective view illustrating a state where a reading mechanism portion is open in the printer according to the invention. FIG. 4 is a sectional view taken along an arrow IV-IV of FIG. 1. FIG. 5 is a sectional view taken along an arrow V-V of FIG. 2. FIG. 6 is a perspective view of the reading mechanism portion. FIG. 7 is a plan view of the reading mechanism portion. FIG. 8 is a perspective view illustrating a state where a document stand is removed in the reading mechanism portion.

Figure 9:
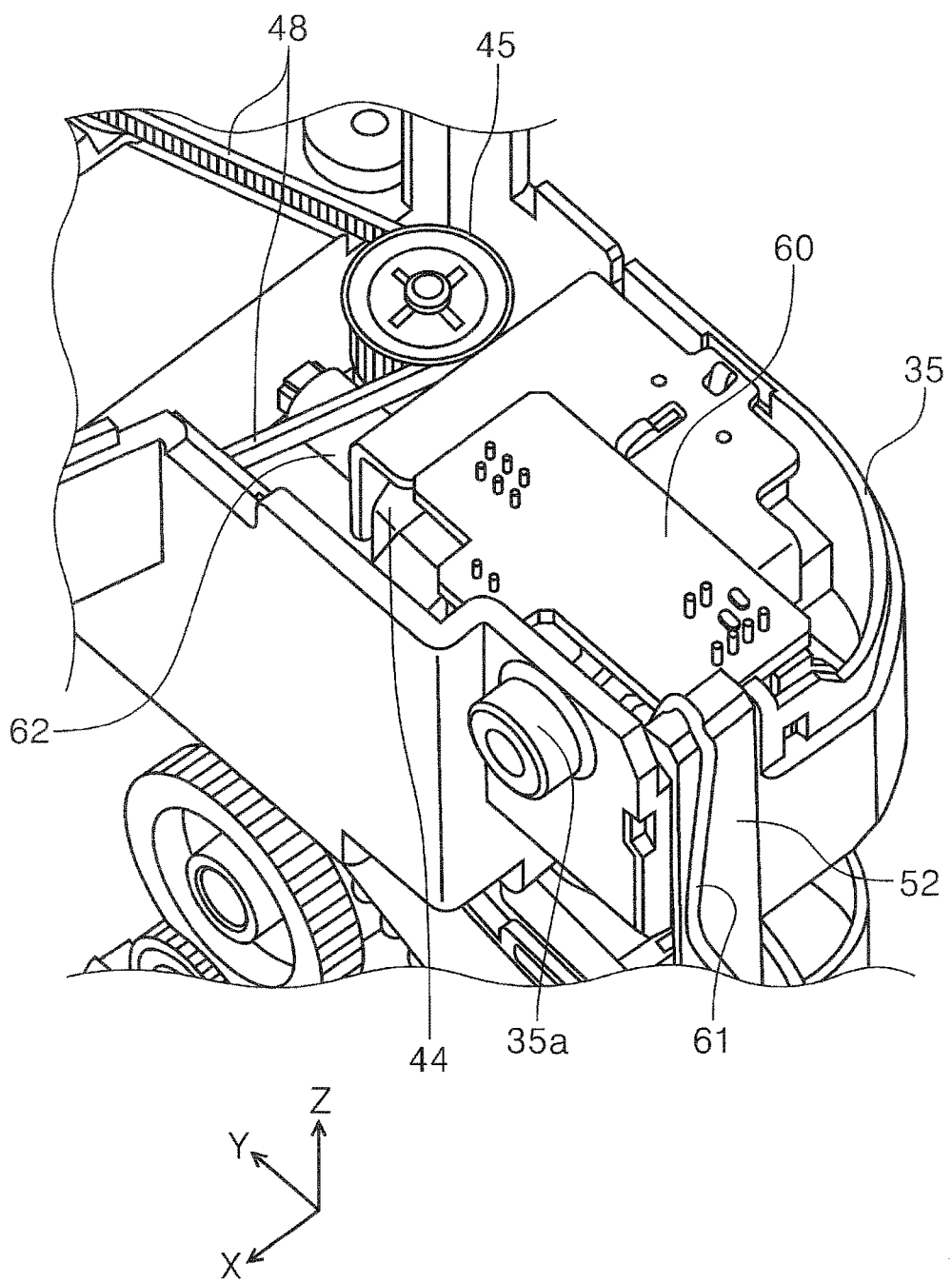
FIG. 9 is an enlarged perspective view of main portions of the reading mechanism portion.
Figure 10:
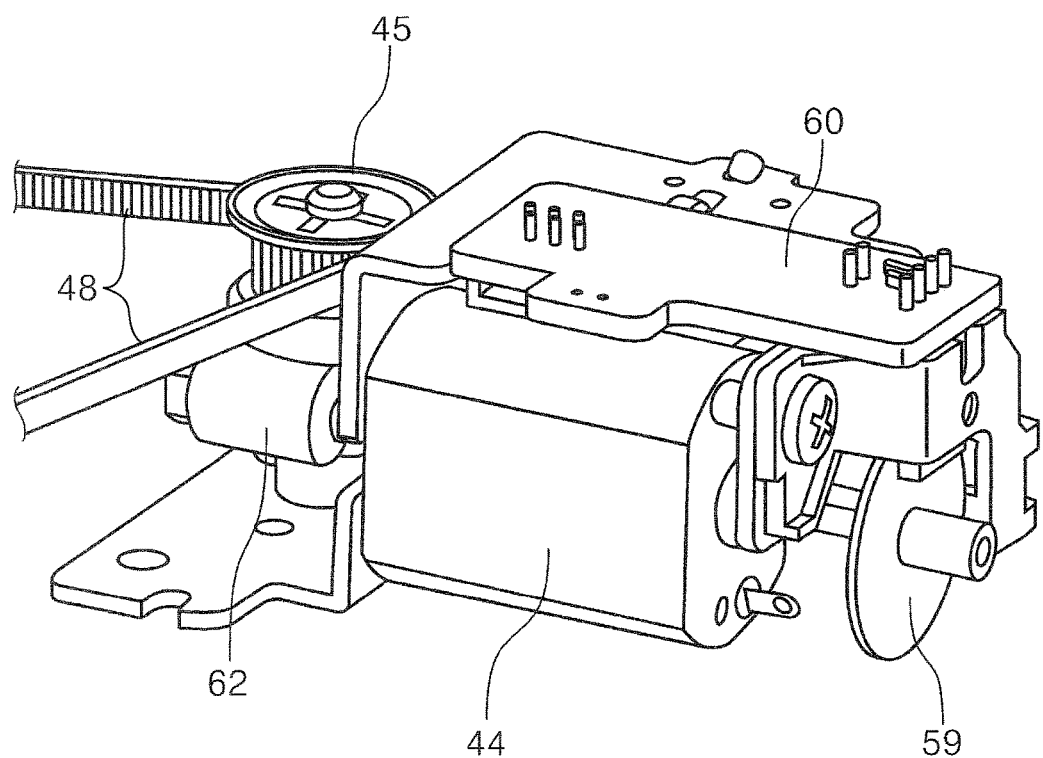
FIG. 10 is an enlarged perspective view of main portions of a moving mechanism of a reading unit.
Figure 11:
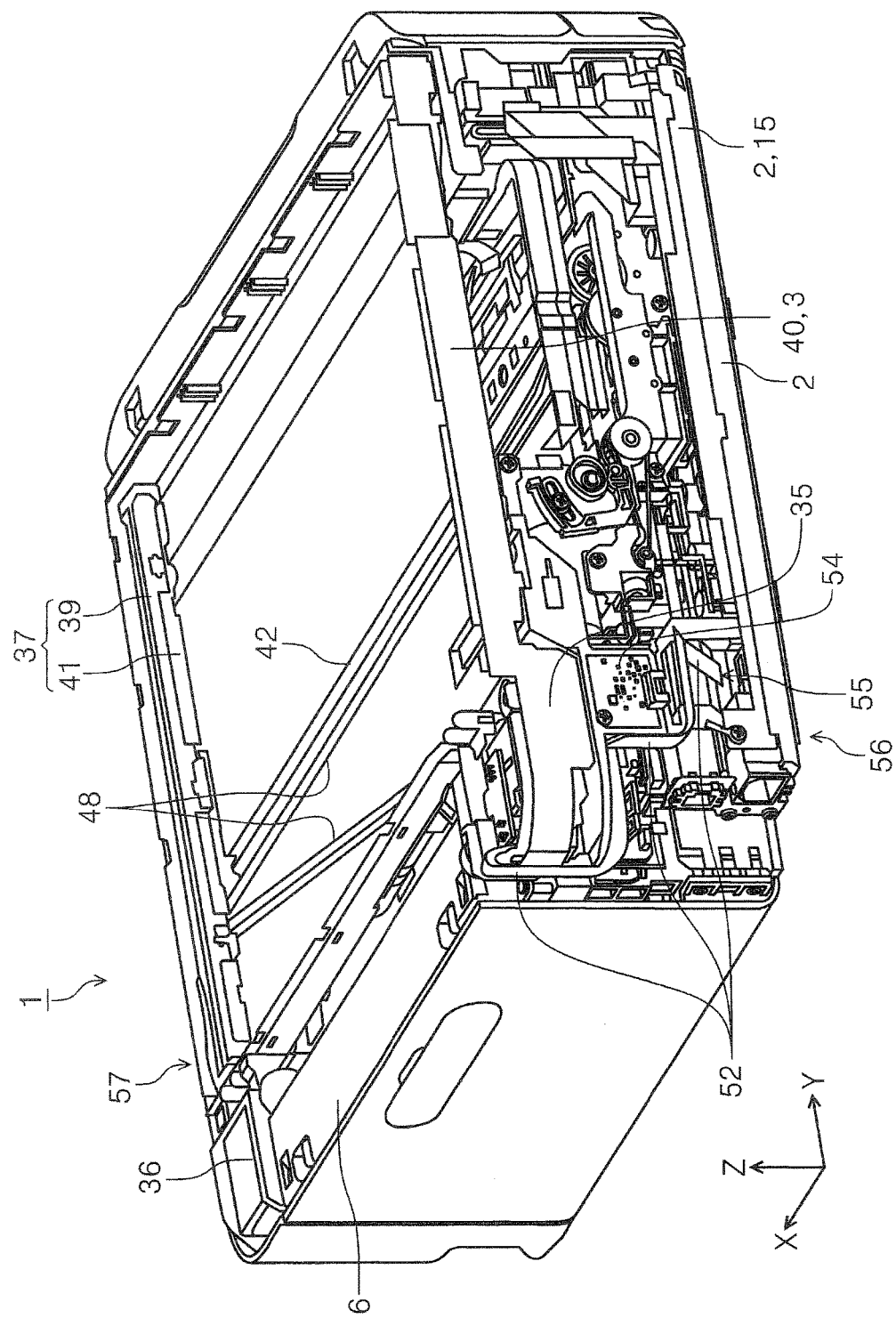
FIG. 11 is a perspective view illustrating a state where an exterior of a side surface of an apparatus main body is removed in the printer according to the invention.
Figure 12:
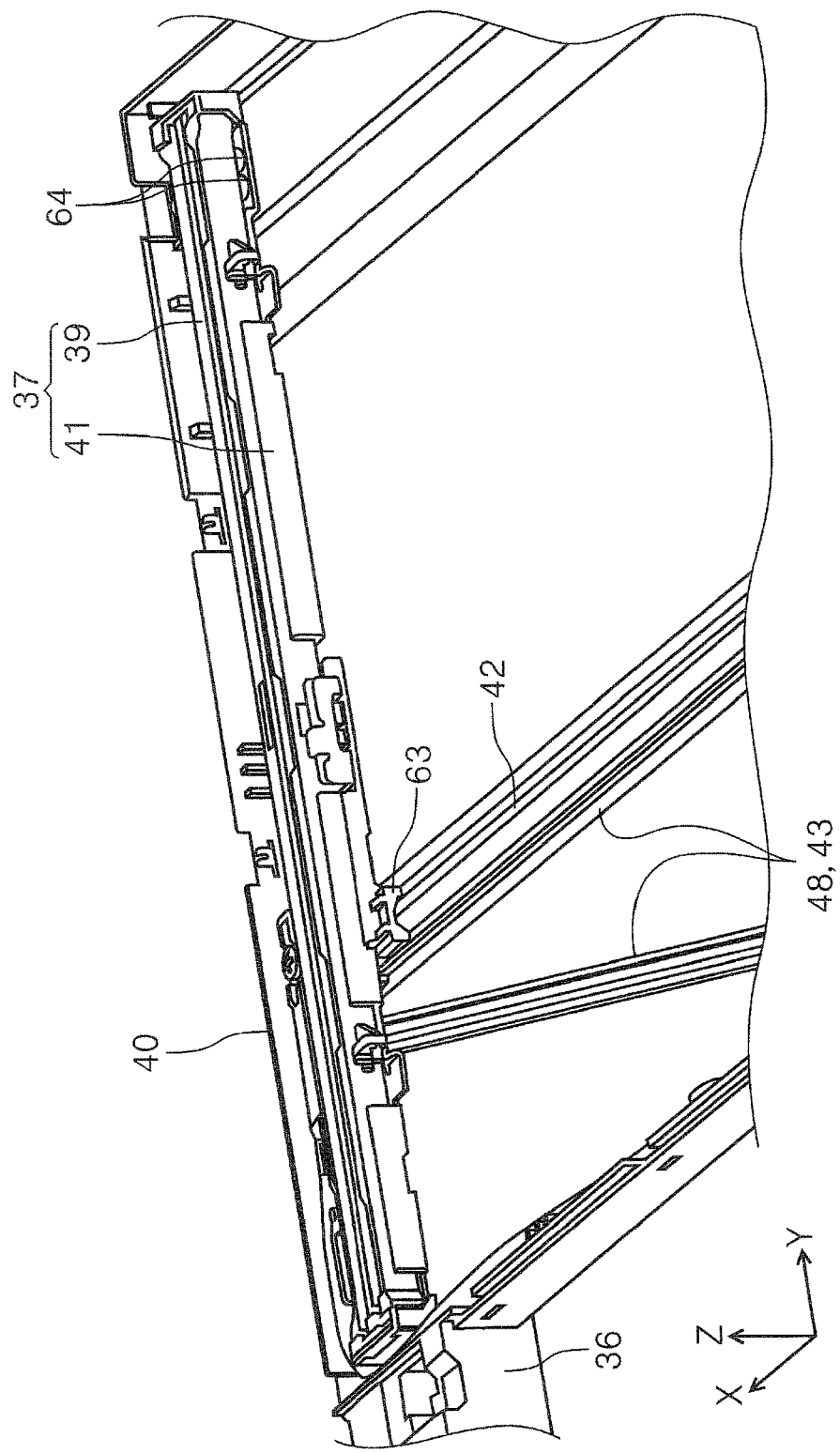
FIG. 12 is a perspective view illustrating the reading unit provided in a reading mechanism portion main body.
Figure 13:
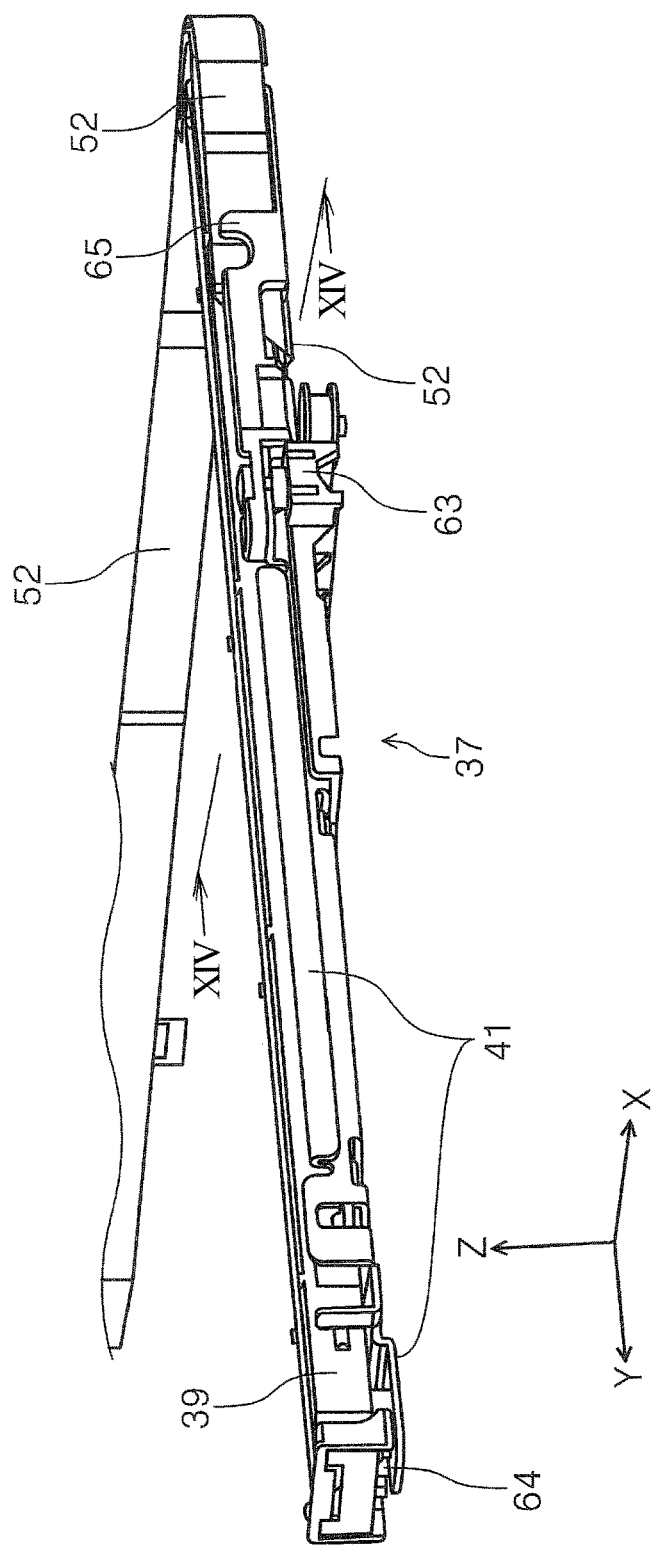
FIG. 13 is a perspective view of the reading unit.
Figure 14:
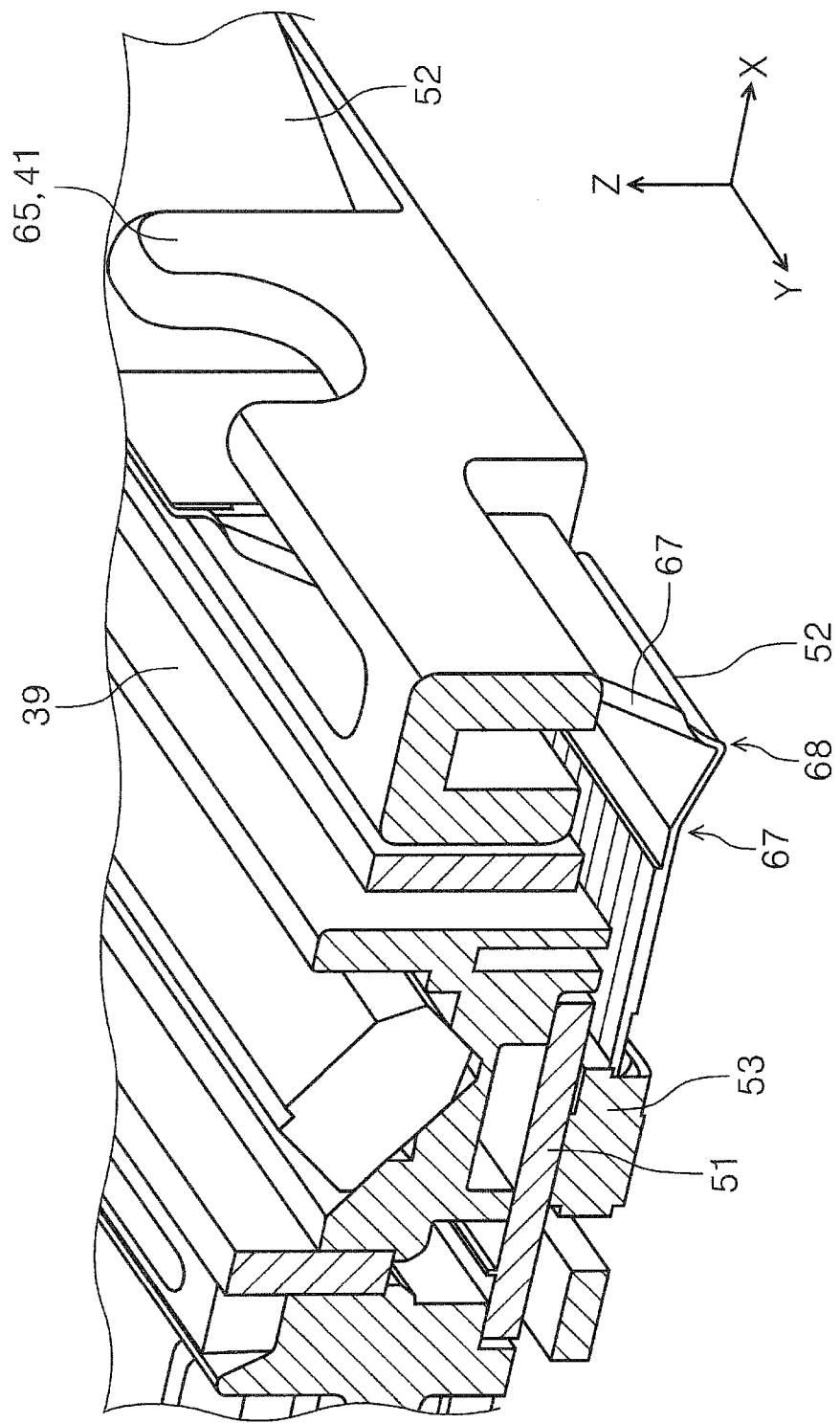
FIG. 14 is a sectional view taken along an arrow XIV-XIV of FIG. 13.
Figure 15:
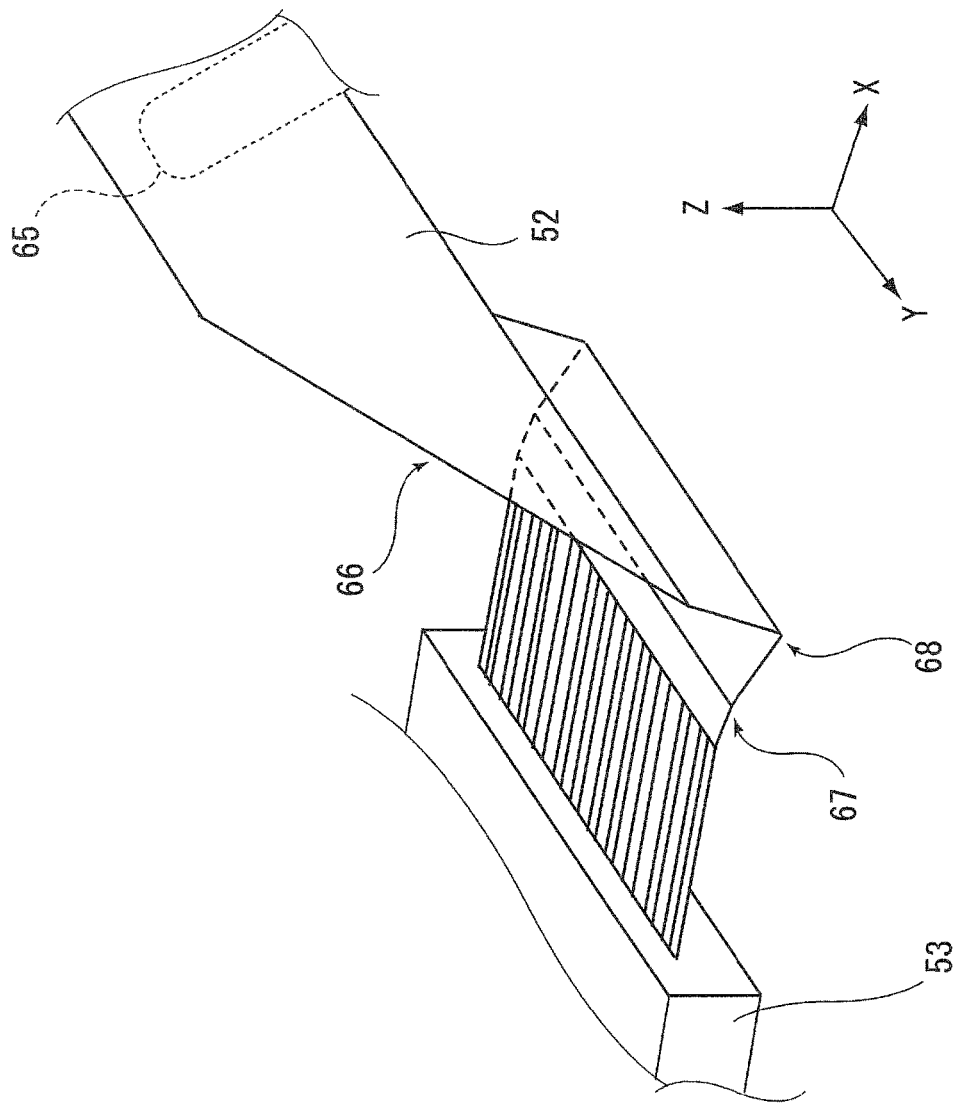
FIG. 15 is a view illustrating a method of folding a cable.
Figure 16:
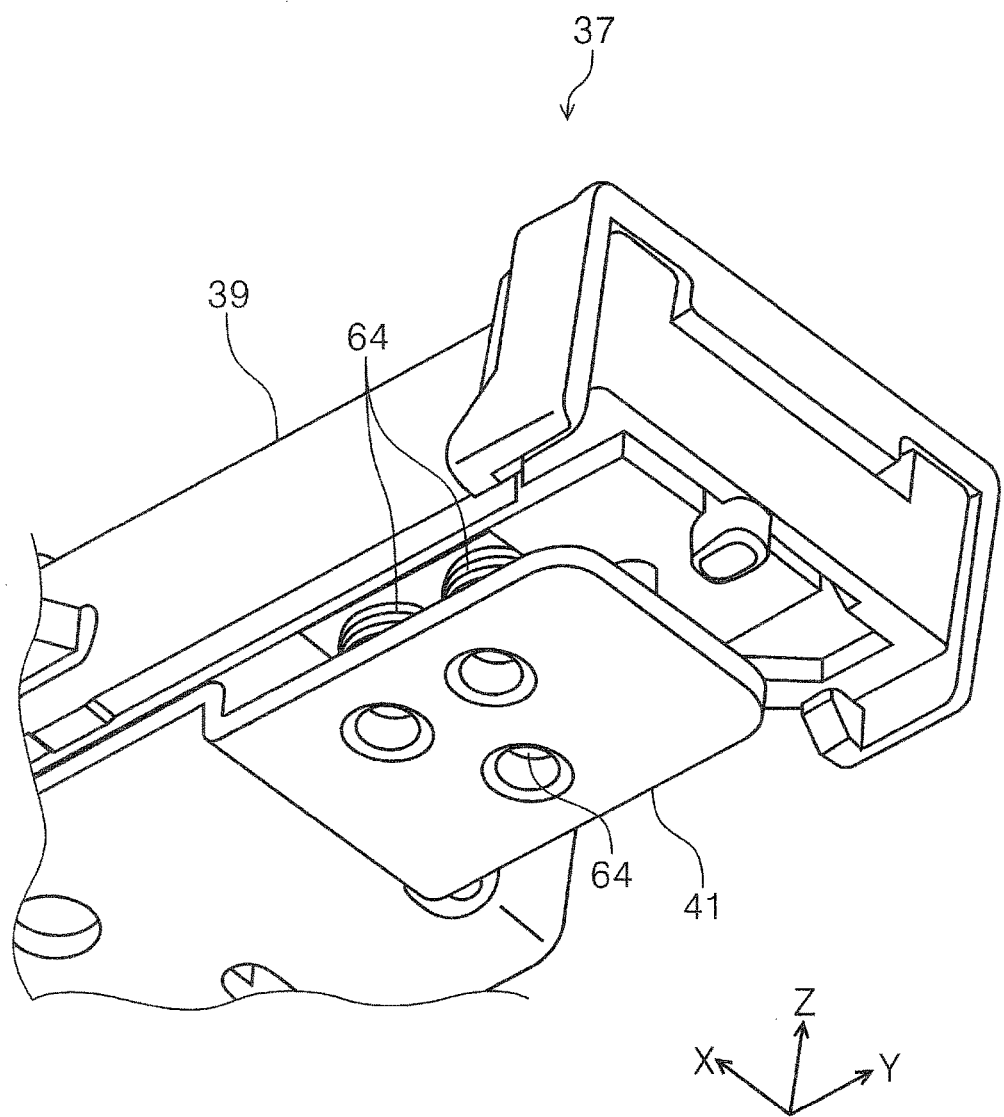
FIG. 16 is a perspective view when main portions of the reading unit are viewed from a lower side.

FIG. 9 is an enlarged perspective view of main portions of the reading mechanism portion. FIG. 10 is an enlarged perspective view of a moving mechanism of a reading unit. FIG. 11 is a perspective view illustrating a state where an exterior of a side surface of an apparatus main body is removed in the printer according to the invention. FIG. 12 is a perspective view illustrating the reading unit provided in a reading mechanism portion main body. FIG. 13 is a perspective view of the reading unit. FIG. 14 is a sectional view taken along an arrow XIV-XIV of FIG. 13. FIG. 15 is a view illustrating a method of folding a cable. FIG. 16 is a perspective view when main portions of the reading unit are viewed from a lower side.

Regarding Entire Configuration of Printer

Hereinafter, the entire configuration of a printer 1 will be schematically described.

The printer 1 (FIG. 1) according to the invention includes: a recording mechanism portion 15 configured of a recording unit (recording head 30 which will be described, refer to FIG. 5) which performs ink jet recording on a paper sheet which is an example of a recording medium in an apparatus main body 2; and a reading mechanism portion 3 (FIG. 3) which is provided in an upper portion of the apparatus main body 2 and reads a document. In other words, the printer 1 is configured as a multifunction machine having a function of a scanner in addition to a function of ink jet recording.

As the paper sheet on which recording is performed, a plain paper sheet, a coated paper sheet, an overhead projector (OHP) sheet, a glossy paper sheet, and a glossy film are used.

Furthermore, in an X-Y-Z coordinate system illustrated in each drawing, the X direction is the scanning direction of a recording head, and the Y direction is the apparatus depth direction. The Z direction is the gravitational direction, and indicates the apparatus height direction. In addition, a +Y direction side is an apparatus front surface side, and a -Y direction side is an apparatus rear surface side. In addition, a right side when viewed from the apparatus front surface side is +X direction, and a left side is the -X direction. In addition, the +Z direction is an upper part of the apparatus (including an upper portion, an upper surface or the like), and the -Z direction side is a lower part of the apparatus (including a lower portion, a lower surface or the like).

In addition, hereinafter, the transport direction (+Y direction side) in which the paper sheet is transported in the printer 1 is referred to as a "downstream side", and the direction (-Y direction) opposite thereto is referred to as an "upstream side".

The reading mechanism portion 3 (FIG. 3) is provided to be rotatable with respect to the apparatus main body 2, and by rotating, a state (FIG. 1) where the upper portion of the apparatus main body 2 is closed and a state (FIG. 3) where the apparatus main body 2 is open, can be obtained. A configuration of the reading mechanism portion 3 will be described in more detail later.

Furthermore, the reading mechanism portion 3 includes a cover 4 (FIG. 1) which is openable and closable in an upper portion thereof, and the cover 4 is configured to open and close a document stand 3a (FIGS. 5 and 6). In addition, a document pressing mat (not illustrated) formed of an elastic material (for example, a spongy) is provided in the cover 4, and when closing the cover 4, the document loaded on the document stand 3a is pressed by the document pressing mat, and a reading surface thereof tightly adheres to the document stand 3a.

On the apparatus front surface, a reference numeral 5 is an operation panel including a power source button, an operation button which performs various types of printing setting and recording, and a display portion which performs preview display of printing setting contents or printing image.

In addition, on the apparatus front surface, a reference numeral 9 is an openable and closable cover which is provided on a lower step side tray 13 (FIG. 5). In addition, as illustrated in FIG. 5, by opening a cover 9, the lower step side tray 13, an upper step side tray 14, and a paper discharge receiving tray 8 are configured to be exposed.

The paper discharge receiving tray 8 is provided to obtain a state (FIG. 1) of being accommodated in the apparatus main body 2 by a motor which is not illustrated, and a state (FIG. 5) of protruding to the front side of the apparatus main body 2, and by achieving the state of protruding to the front side of the apparatus main body 2, it is possible to receive the paper sheet discharged by performing the recording.

The lower step side tray 13 and the upper step side tray 14 provided in the upper portion thereof can accommodate a plurality of paper sheets, and each of the lower step side tray 13 and the upper step side tray 14 is independent from each other, and is attachable to and detachable from the apparatus main body 2. In addition, even when one side is in a state where the paper sheet is not mounted yet, when the other side is in a state where the paper sheet is mounted, the paper sheet can be sent out from the tray on which the paper sheet is mounted.

In addition, in a rear upper portion of the apparatus main body 2, a reference numeral 6 is an openable and closable manual feed cover, and by opening the manual feed cover 6 as illustrated in FIG. 2, the paper supply is performed by manual paper supply in which a manual feed tray 7 is used.

Next, a paper transporting path of the printer 1 will be described with reference to FIG. 5. First, feeding of the paper sheet from the manual feed tray 7 will be described, and then, feeding of the paper sheet from the lower step side tray 13 or the upper step side tray 14 provided in the bottom portion of the apparatus, will be described.

Furthermore, in FIG. 5, a feeding path T1 of a paper sheet P from the manual feed tray 7 is illustrated by a two-dot chain line. In addition, a feeding path T2 of the paper sheet P from the lower step side tray 13 or the upper step side tray 14 to the upstream side of a transport driving roller 24 is illustrated by a dot line.

The highest paper sheet set by a set port 50 of the manual feed tray 7, is picked up by the second feeding roller 21 and sent to the downstream side.

At a tip of the second feeding roller 21, the transport driving roller 24 driven to be rotated by the motor which is not illustrated, and a transport driven roller 25 which is rotated to be driven being in contact with the transport driving roller 24, are provided, and the paper sheet P is sent to a lower part of the recording head 30 by the rollers.

Next, the recording head 30 which discharges ink as a liquid is provided in the bottom portion of a carriage 29, and the carriage 29 is driven to reciprocate in the auxiliary scanning direction (X-axis direction) by the motor which is not illustrated.

At a position which opposes the recording head 30, a medium supporting member 28 which supports the transported paper sheet P is provided, and an interval (PG) between the paper sheet P and the recording head 30 is regulated by the medium supporting member 28.

In addition, on the downstream side of the medium supporting member 28, a discharge driving roller 31 which is driven to be rotated by the motor which is not illustrated, and a discharge driven roller 32 which is rotated to be driven being in contact with the discharge driving roller 31, are provided. The paper sheet P on which the recording is performed by the recording head 30 is discharged toward the above-described paper discharge receiving tray 8 by the rollers.

In addition, the printer 1 includes the lower step side tray 13 and the upper step side tray 14 in the bottom portion of the apparatus, and the paper sheets can be fed one by one from the lower step side tray 13 or the upper step side tray 14.

The upper step side tray 14 is configured to be provided to be slidable (displacement) between a feedable position (FIG. 5) and a retreating position (not illustrated) moved to the apparatus front surface side (the rightward direction in FIG. 5: the drawing-out direction side of the upper step side tray 14), to receive the power of the motor which is not illustrated, and to displace the feedable position and the retreating position.

Furthermore, in FIG. 5, respectively, a paper sheet accommodated in the lower step side tray 13 is illustrated by a reference numeral P1, and a paper sheet accommodated in the upper step side tray 14 is illustrated by a reference numeral P2 (hereinafter, in a case where it is not necessary to particularly distinguish, the paper sheet is referred to as "paper sheet P").

A first feeding roller (also called a pickup roller) 10 which is driven to be rotated by the motor which is not illustrated, is provided in a roller supporting member 11 (also called a pickup arm or an oscillation member) which oscillates around a rotation shaft 12, and when the upper step side tray 14 slides and is at a butting position on the most apparatus rear side (the leftward direction in FIG. 5: the mounting direction side of the upper step side tray 14, and the paper sending-out direction side), at the feedable position of the upper step side tray 14, as the first feeding roller 10 rotates being in contact with the highest paper sheet P2 accommodated in the upper step side tray 14, the highest paper sheet P2 is sent out from the upper step side tray 14.

Meanwhile, in a state where the upper step side tray 14 slides to the apparatus front surface side (+Y side), that is, when the upper step side tray 14 is at the above-described retreating position, the roller supporting member 11 oscillates around the rotation shaft 12, the first feeding roller 10 can be in contact with the highest paper sheet P1 accommodated in the lower step side tray 13, and as the first feeding roller 10 rotates, the highest paper sheet P1 is sent out from the lower step side tray 13.

Furthermore, as described above, even in a case where the paper sheet is not mounted on any one side, the lower step side tray 13 and the upper step side tray 14 can feed the paper sheet from the other side.

On the downstream side of the first feeding roller 10, an intermediate roller 17 which is driven to be rotated by the motor which is not illustrated is provided, and the paper sheet P is curved and reversed by the intermediate roller 17, and is toward the apparatus front side. Furthermore, reference numerals 19 and 20 are driven rollers which can be rotated to be driven, and at least the paper sheet P is nipped by the driven roller 19 and the intermediate roller 17, and additionally, is nipped by the driven roller 20 and the intermediate roller 17, and sent to the downstream side.

The paper sheet sent along the feeding path T2 illustrated by a dot line is merged with the feeding path T1 (two-dot chain line) in front of the transport driving roller 24 and the transport driven roller 25, and further on the downstream side, similar to the paper sheet fed from the manual feed tray 7, the paper sheet is transported by the transport driving roller 24 and the transport driven roller 25, and is discharged toward the paper discharge receiving tray 8 by the discharge driving roller 31 and the discharge driven roller 32 after the recording is performed by the recording head 30.

In addition, in a case where the recording is performed on both surfaces of the paper sheet P, after the recording is performed on a front surface by the recording head 30, by switching back, the paper sheet P enters the transporting path from a lower side of the intermediate roller 17, and by curving and reversing, it is possible to perform the recording on a rear surface of the paper sheet P. Furthermore, a reference numeral 18 is a driven roller which can be rotated to be driven by the rotation of the intermediate roller 17.

Regarding Configuration of Reading Mechanism Portion

Next, a configuration of the reading mechanism portion 3 will be described.

As described above, in the upper portion of the apparatus main body 2, the reading mechanism portion 3 (FIG. 3) is linked to the apparatus main body 2 to be rotatable, and by rotating, the reading mechanism portion 3 opens and closes the upper portion of the apparatus main body 2.

More specifically, the reading mechanism portion 3 is linked to be rotatable to the apparatus main body 2 in a first linking portion 35 and a second linking portion 36. Rotation shafts 35*a* and 36*a* are provided in each of the first linking portion 35 and the second linking portion 36, the rotation shafts 35*a* and 36*a* are pivotally supported around a bearing which is not illustrated and is provided on the apparatus main body 2 side, and the reading mechanism portion 3 rotates to open and close the upper portion of the apparatus main body 2.

The reading mechanism portion 3 is provided with the document stand 3*a* (FIG. 6), and an upper surface of the document stand 3*a* becomes a document loading surface on which the document is loaded. The document stand 3*a* is a transparent glass plate in the example. The periphery of the document stand 3*a* is configured of a plurality of frames 33*a*, 33*b*, 33*c*, and 33*d* (FIGS. 6 and 7), and a rectangular region (FIG. 7, reference numeral 34) divided by the frames 33*a*, 33*b*, 33*c*, and 33*d* becomes a document reading region 34 which can perform reading by a reading unit 37 which moves in a reading mechanism portion main body 40.

In other words, in the example, the reading mechanism portion 3 is a flat-bed type scanner, and on a lower side of the document stand 3*a*, the reading unit 37 is provided to be relatively movable to the document stand 3*a*.

The reading unit 37 is provided in the reading mechanism portion main body 40, extends in the main scanning direction (Y-axis direction), and is configured of a moving mechanism 43 which will be described later to be movable in the auxiliary scanning direction (X-axis direction) intersecting with the main scanning direction. Furthermore, in the example, the main scanning direction corresponds to the short side direction of the document reading region, and the auxiliary scanning direction corresponds to a long side direction of the document reading region.

The reading unit 37 moves to a position (a position of the reading unit 37 illustrated by a two-dot chain line in FIG. 7) on a −X side from a position (a position of the reading unit 37 illustrated by a one-dot chain line in FIG. 7) on a +X side of the document reading region 34, in the moving direction (X-axis direction). Therefore, the rectangular region illustrated by a dotted line with a reference numeral 38 is a moving region 38 of the reading unit 37.

The reading unit 37 is configured of a reading sensor 39 and a sensor carriage 41 which holds the reading sensor 39 (FIG. 12).

The reading sensor 39 is an optical sensor which is provided with a light source and a light receiving portion which are not illustrated, emits light from the light source to the document loaded on the document stand 3a, receives the reflected light from the document by the light receiving portion, and reads the information of the document. For example, it is possible to use a charge coupled devices (CCD) type or a contact image sensor (CIS) type optical sensor.

The sensor carriage 41 which configures the reading unit 37 (FIG. 12) is configured to be engaged with a guide portion 42 to be movable in a slide portion 63 provided in the lower portion thereof, to be guided to the guide portion 42, and to move in the auxiliary scanning direction (X-axis direction) by the power of a motor 44 (FIG. 8) that serves as a power source which moves the sensor carriage 41.

More specifically, the sensor carriage 41 is driven by the moving mechanism 43 (FIG. 8) by driving a belt which will be described later, is guided to the guide portion 42, and slides and moves in the X-axis direction. In other words, the reading unit 37 is configured to move by the power of the motor 44.

As illustrated in FIG. 8, the moving mechanism 43 of the sensor carriage 41 (reading unit 37) includes a driving pulley 45 driven by the motor 44, two driven pulleys 46 which are rotatably driven by the driving pulley 45, a driven pulley 47, the driving pulley 45, and an endless belt 48 which is engaged and rotates between the driven pulley 46 and the driven pulley 47.

The driven pulley 46 and the driven pulley 47 are disposed in the vicinity of the end portion on one side of the guide portion 42, and in the vicinity of the end portion on the other side.

Furthermore, a reference numeral 49 is a biasing portion which applies tension to the endless belt 48. The biasing portion 49 can also be provided between the driving pulley 45 and the driven pulley 47 or between the driven pulley 46 and the driven pulley 47, other than a space between the driving pulley 45 and the driven pulley 46.

A configuration in which the sensor carriage 41 is fixed to the endless belt 48 at a part along the guide portion 42 in the endless belt 48, that is, at the position between the driven pulley 46 and the driven pulley 47, the endless belt 48 rotates by driving the motor 44, and a sensor carriage 41 reciprocates in the X-axis direction being attracted to the endless belt 48, is achieved. By the configuration, since the reading unit 37 is attracted by the endless belt 48 provided to be close to the guide portion 42, it is possible to smoothly move the reading unit 37.

Furthermore, in the motor 44, an encoder 59 (FIG. 10) for detecting the position of the reading unit 37 is provided, and further, a relay substrate 60 in which a wiring (not illustrated) of the motor 44 and a wiring (not illustrated) of the encoder 59 are integrated with a wiring (FIG. 9), is provided. Driving of the motor 44 is transmitted to the driving pulley 45 via a worm gear 62 (FIG. 9), and power is transmitted to the endless belt 48 and the reading unit 37 fixed to the endless belt 48 by the driving pulley 45.

Here, the motor 44 is disposed at a position of the first linking portion 35 disposed on the outside of the moving region 38 when the moving region 38 of the reading unit 37 is viewed in a plan view (FIG. 7). In addition, as illustrated in FIGS. 8 and 9, the motor 44 is disposed on the inside of the housing which configures the first linking portion 35.

There are many cases where the motor 44 which is a power source of the reading unit 37 in the reading mechanism portion 3 is a relatively heavy object (heavy). As the motor 44 which is a heavy object is disposed in the first linking portion 35 in which the rotation shaft 35a of the reading mechanism portion 3 is provided, it is possible to open the reading mechanism portion 3 by a small force when opening the reading mechanism portion 3. In addition, since inertia is also small when closing the reading mechanism portion 3, for example, it is possible to suppress a concern that the reading mechanism portion 3 or the recording mechanism portion 15 is damaged by an impact or the like when closing the reading mechanism portion 3.

Additionally, for example, in a case where a so-called free-stop mechanism which holds the reading mechanism portion 3 by a predetermined opening angle is provided, since it is possible to hold the reading mechanism portion 3 by a small force, it is possible to achieve low costs or light weight of the free-stop mechanism. Accordingly, this leads to low costs or light weight of the printer 1.

Furthermore, the motor 44 may be disposed at least in any of the first linking portion 35 and the second linking portion 36, and can also be disposed on the second linking portion 36 side.

In addition, since the motor 44 is disposed by using the first linking portion 35 at a configuration part for making it possible to rotate the reading mechanism portion 3, it is possible to achieve reduction of the size of the apparatus.

At the position of the first linking portion 35, it is desirable that the motor 44 is disposed at a position which crosses, particularly, a rotation shaft line of the reading mechanism portion 3, that is, a shaft line of the rotation shaft 35a. Furthermore, it is more desirable that a centroid of the motor 44 is disposed at a position which crosses the rotation shaft line of the reading mechanism portion 3.

According to this, it is possible to open the reading mechanism portion 3 which is opened and closed by rotating by a smaller force. In addition, when closing the reading mechanism portion 3, it is possible to reduce a concern about damage of the reading mechanism portion 3 or the recording mechanism portion 15 since inertia becomes smaller.

In addition, in the embodiment, at least a part of the motor 44 and at least a part of the carriage 29 provided with the recording head 30 are provided to overlap each other in the apparatus height direction (Z-axis direction) (FIG. 4). In other words, at least a part of the motor 44 and at least a part of the carriage 29 are provided to be at the same position in the apparatus height direction. Accordingly, it is possible to suppress a dimension in the height direction in the printer 1.

For example, in the technology in the related art (for example, JP-A-11-215320) of extending the endless belt between the driving pulley and the driven pulley which are provided at positions of both ends of the guide portion 42, since the power source (motor or the like) of the driving pulley is disposed to be close to the driving pulley, the power source is provided at the height which does not interfere with the configuration member which is the recording mechanism portion 15 positioned at a lower part of the reading mechanism portion 3. The guide portion 42 is provided in the vicinity of the center in the Y-axis direction of the reading mechanism portion main body 40, but since the configuration member, such as the carriage 29, is provided at the position (the vicinity of the center in the Y-axis direction) in the apparatus main body 2, there was a limit to making the apparatus compact in the apparatus height direction.

In the example, since the motor 44 is provided at the position of the first linking portion 35 in the vicinity of the end portion in the Y-axis direction of the reading mechanism portion main body 40, a degree of freedom of layout of the motor 44 is improved.

Furthermore, the first linking portion 35 and the second linking portion 36 are divisions of a part of the reading mechanism portion main body 40 which configures an appearance of the reading mechanism portion 3, and are a part linked to the apparatus main body 2.

In the example, the moving region 38 (refer to FIG. 7) of the reading unit 37 is large only as much as a region in which the reading unit 37 is positioned on both sides, with respect to the document reading region 34 which corresponds to the document (for example, an A4 size or a letter size) having the largest size which can be read, in the X-axis direction. The width in the X-axis direction of the reading mechanism portion main body 40 is the size which corresponds to the moving region 38 of the reading unit 37.

In addition, the recording mechanism portion 15 can perform the recording with respect to the paper sheet having the same size as that of the document having the largest size which can be read in the reading mechanism portion 3, and a set port 50 of the paper sheet of the manual feed tray 7 sets a long side of the paper sheet to be oriented along the transport direction (Y-axis direction).

Therefore, the width in the X-axis direction of the set port 50 of the paper sheet is narrower than the width in the X-axis direction of the reading mechanism portion main body 40.

As illustrated in FIG. 11, in a case where the width sizes of the apparatus main body 2 and the reading mechanism portion main body 40 which are disposed to overlap up and down are the same, an external appearance is excellent, and it is possible to make a shape which is easily handled without unevenness, but since the width of the set port 50 is narrower than that of the reading mechanism portion main body 40, a surplus region can be made in the X-axis direction.

Here, in the example, the first linking portion 35 and the second linking portion 36 are configured as divisions provided in the surplus region in the X-axis direction of the set port 50.

In other words, the first linking portion 35 and the second linking portion 36 of the reading mechanism portion 3 are provided on both sides in the paper width direction of the set port 50 of the manual feed tray 7 in the apparatus main body 2 (FIG. 7).

More specifically, the set port 50 is disposed on the outside in the main scanning direction (Y-axis direction) with respect to the moving region 38 of the reading unit 37, the first linking portion 35 and the second linking portion 36 are disposed to nip the set port 50 in the auxiliary scanning direction (X-axis direction), and a rectangular housing outline is configured of the moving region 38, the first linking portion 35, the second linking portion 36, and the set port 50 when the moving region 38 is viewed in a plan view. Accordingly, it is possible to make a compact and excellent appearance.

Furthermore, the disposition of the moving region 38, the first linking portion 35, and the second linking portion 36, may be disposed at other positions which avoid the set port 50 of the paper sheet in the apparatus main body 2, in addition to the disposition described in the example.

By disposing the first linking portion 35 and the second linking portion 36 at the position which avoids the set port 50, it is possible to effectively use a space around the set port 50, and to suppress an increase in size of the apparatus when the printer 1 is viewed in a plan view.

In addition, in the reading mechanism portion 3, the reading sensor 39 which is held by the sensor carriage 41 is provided with a sensor substrate 51 (FIG. 14) which converts reading data read by the reading sensor 39 into an electric signal on a lower surface side (−Z direction side), and on the sensor substrate 51, a connection portion 53 to which one end of a cable 52 (in the example, a flexible flat cable, FFC) is connected, is provided.

The other end of the cable 52 is connected to a connection portion 55 (FIG. 11) on a main substrate 54 (FIG. 11) side provided in the apparatus main body 2.

The cable 52 is a cable which transfers the reading data of the image converted into an electric signal on the sensor substrate 51 on the reading mechanism portion 3 side, to the main substrate 54 provided in the apparatus main body 2, and is a cable which electrically connects the recording mechanism portion 15 and the reading mechanism portion 3 to each other in the apparatus main body 2.

As illustrated in FIGS. 13 and 14, the cable 52 is drawn out from the lower surface side of the reading sensor 39, extends in the −Y direction along the side surface on the +X direction side of the sensor carriage 41, and then, as illustrated in FIG. 8, the cable 52 enters the first linking portion 35 in which the motor 44 is provided along the inner wall surface on the −Y side of the reading mechanism portion main body 40. Furthermore, as illustrated in FIG. 9, the cable 52 extends out from the vicinity of the rotation shaft 35*a* of the first linking portion 35, goes to the outside of the reading mechanism portion 3, and as illustrated in FIG. 11, the cable 52 is provided to enter the inside of the apparatus main body 2.

In addition, the main substrate 54 to which the cable 52 is connected in the apparatus main body 2 which configures the recording mechanism portion 15 is disposed on a side surface 56 on a side near the first linking portion 35 (FIG. 11).

By providing the main substrate 54 on the recording mechanism portion 15 side on the side surface 56 on a side near the first linking portion 35 provided with the motor 44, it is possible to shorten the length of the cable 52 which connects the recording mechanism portion 15 and the reading mechanism portion 3 to each other. In addition, it is possible to easily connect the cable 52 to the main substrate 54. In a case where the motor 44 is provided on the second linking portion 36 side, it is also possible to employ a similar configuration. In this case, the main substrate 54 is provided on a side surface 57 near the second linking portion 36.

Furthermore, the cable 52 (FIG. 8) provided along an inner wall surface on the −Y side of the reading mechanism portion main body 40 is fixed to the inner wall surface by fixing portions 58*a*, 58*b*, and 58*c*. The cable 52 further on the +X side than the fixing position illustrated by a reference numeral 58*c* is in a free state, and is configured to be capable of following the movement of the sensor carriage 41, that is, the movement of the reading unit 37.

Example 2

Figure 17:
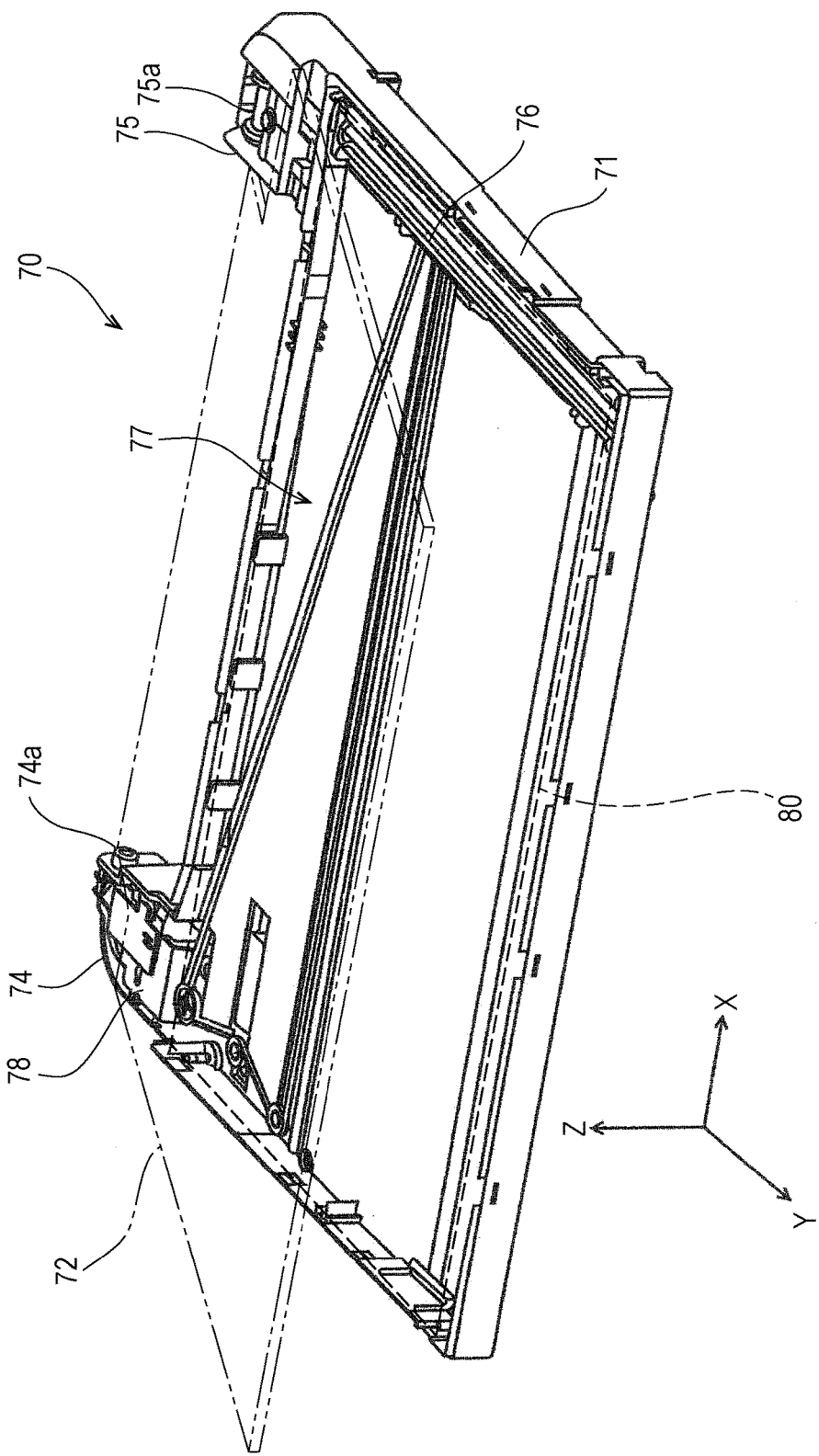
FIG. 17 is a perspective view illustrating a state where a document cover is open in a reading apparatus according to Example 2.

Hereinafter, with reference to FIG. 17, an example of the reading apparatus according to the invention will be described. FIG. 17 is a perspective view illustrating a state where a document cover is open in the reading apparatus according to Example 2.

A reading apparatus 70 illustrated in FIG. 17 is configured of a reading mechanism portion 71 including a reading unit 76.

Regarding the reading unit 76 provided in the reading mechanism portion 71 and a moving mechanism 77 thereof, a configuration which is the same as that of the reading unit 37 and the moving mechanism 43 which are provided in the reading mechanism portion 3 of the printer 1 of Example 1, can be employed. Therefore, a specific description thereof will be omitted.

Furthermore, in FIG. 17, the document stand which configures an upper surface of the reading mechanism portion 71 is not illustrated and omitted.

In addition, the reading mechanism portion 71 is provided with a document cover 72 illustrated by a two-dot chain line in FIG. 17. The document cover 72 is linked to the reading mechanism portion 71 to be rotatable, and is provided as an opening and closing body which opens and closes the upper portion of the reading mechanism portion 71 by rotating.

More specifically, the document cover 72 is disposed on the outside of a moving region 80 of the reading unit 76 in the reading mechanism portion 71, and is linked to a first linking portion 74 and a second linking portion 75 to be rotatable.

In addition, in the first linking portion 74, a motor 78 which serves as a driving source of the moving reading unit 76, is provided.

In the reading mechanism portion 71, as the motor 78 which drives the reading unit 76 is disposed by using the first linking portion 74 which is at a configuration part for making it possible to rotate the document cover 72, it is possible to achieve reduction of the size of the reading apparatus 70.

Furthermore, the document cover 72 may have a configuration in which an auto document feeder which automatically sends the reading document is provided in an upper portion of the cover.

In addition, it is also needless to say that the motor 78 is provided on the second linking portion 75 side.

Furthermore, the invention is not limited to the above-described embodiment, various modifications are possible within a range of the invention described in the range of the claims are possible, and the modifications are included in the range of the invention.

Another Configuration in Reading Mechanism Portion

Hereinafter, another configuration in the reading mechanism portion 3 will be described.

The reading sensor 39 is biased in the +Z direction by a spring 64 (FIGS. 12 and 16) provided between the reading sensor 39 and the sensor carriage 41, and the reading sensor 39 is pressed to the rear surface of the document stand 3*a*.

In a case where the size in the height direction of the apparatus is suppressed, it is necessary to reduce an interval between the reading sensor 39 and the sensor carriage 41, but since the operation length of the spring 64 provided in the interval is also shortened, it becomes difficult to obtain a load necessary for pressing the reading sensor 39 to the document stand 3*a*. In the printer 1, by providing the plurality of springs 64 (three in the printer 1), the spring 64 is provided in a slight void, and a load necessary for pressing the reading sensor 39 to the document stand 3*a* is realized.

In addition, the spring 64 is provided in the end portion on the +Y side in the main scanning direction of the sensor carriage 41 (reading unit 37). As the spring 64 which presses the reading sensor 39 to the document stand 3*a* is provided at a position separated from the endless belt 48, it is possible to suppress or avoid a contact state of the sensor carriage 41 with the endless belt 48.

Next, as illustrated in FIG. 14, the cable 52 drawn out from the lower surface side of the reading sensor 39 is folded by a first folding portion 66, and is fixed by a fixing portion 65 as the direction is changed to be along the side surface on the +X direction side of the sensor carriage 41.

In addition, the cable 52 has two folding portions, such as a second folding portion 67 and a third folding portion 68, on the lower surface side of the reading sensor 39, that is, further on the connection portion 53 side than the first folding portion 66 (also refer to FIG. 15). The folding directions of the second folding portion 67 and the third folding portion 68 are opposite to each other. For example, when the second folding portion 67 is folded upward, the third folding portion 68 is folded downward.

Here, since a focal distance of the reading sensor 39 is maintained, the reading sensor 39 is always pressed to a rear surface of the document stand 3*a*. Even when the reading sensor 39 moves up and down when the sensor carriage 41 moves, the spring 64 (FIG. 12) is provided to bias the reading sensor 39 to abut against the rear surface of the document stand 3*a*. Therefore, it is necessary that the reading sensor 39 can move up and down with respect to the sensor carriage 41.

As the second folding portion 67 and the third folding portion 68 are provided in the cable 52, between the connection portion 53 of the reading sensor 39 and the fixing portion 65 in the sensor carriage 41, it is possible to ensure the length of the cable 52 which allows the upward and downward movement of the reading sensor 39 with respect to the sensor carriage 41.

The entire disclosure of Japanese Patent Application No. 2016-035166, filed Feb. 26, 2016 is expressly incorporated by reference herein.

What is claimed is:

1. A recording apparatus comprising:
   an apparatus main body including a recording mechanism portion provided with a recording unit that performs recording on a recording medium; and
   a reading mechanism portion which is linked to the apparatus main body to be rotatable via a rotation shaft in an upper portion of the apparatus main body, and reads a document,
   wherein the reading mechanism portion includes
      a reading unit which extends in a main scanning direction, and moves in an auxiliary scanning direction intersecting with the main scanning direction,
      a motor which moves the reading unit, and
      a first linking portion and a second linking portion which are disposed on the outside of a moving region when the moving region of the reading unit is viewed in a plan view, and are linked to the recording mechanism portion to be rotatable, and
   wherein the motor is disposed at least in a housing of the first linking portion or a housing of the second linking portion.

2. The recording apparatus according to claim 1,
wherein the first linking portion and the second linking portion are formed in a housing having the rotation shaft, and the motor is provided on the inside of the housing at least in any of the first linking portion and the second linking portion.

3. The recording apparatus according to claim 1,
wherein at least a part of a carriage provided with the recording unit and at least a part of the motor overlap each other in an apparatus height direction.

4. The recording apparatus according to claim 1,
wherein the motor is disposed at a position which crosses a rotation shaft line of the rotation shaft of the reading mechanism portion.

5. The recording apparatus according to claim 1, further comprising:
a detector which detects a position of the reading unit; and
a relay substrate which connects a cable from the detector and a cable from the motor with each other,
wherein the relay substrate is disposed at least in any of the first linking portion and the second linking portion.

6. The recording apparatus according to claim 1,
wherein the apparatus main body has a set port which sets a recording medium in the upper portion thereof, and
wherein the first linking portion and the second linking portion are disposed to avoid the set port.

7. The recording apparatus according to claim 6,
wherein the set port is disposed on the outside in the main scanning direction, with respect to the moving region,
wherein the first linking portion and the second linking portion are disposed to nip the set port in the auxiliary scanning direction, and
wherein a rectangular housing outline is configured of the moving region, the first linking portion, the second linking portion, and the set port when the moving region is viewed in a plan view.

8. The recording apparatus according to claim 1,
wherein the reading mechanism portion includes
an endless belt which is engaged and rotates between a driving pulley which is driven by the motor and a driven pulley which is rotatably driven and attracts the reading units, and
a guide portion which guides the reading unit in the auxiliary scanning direction, and
wherein the driven pulley is disposed in the vicinity of an end portion on one side of the guide portion and in the vicinity of an end portion on the other side.

9. The recording apparatus according to claim 1, further comprising:
a cable which electrically connects the recording mechanism portion and the reading mechanism portion,
wherein the cable extends from at least one of the first linking portion and the second linking portion which are provided with the motor, and enters the inside of the apparatus main body, and
wherein a substrate to which the cable is connected on the inside of the apparatus main body is disposed on a side surface on a side near the first linking portion or the second linking portion which is provided with the motor.

10. A reading apparatus comprising:
a reading mechanism portion which has a loading surface that reads a document; and
an opening and closing body which is linked to the reading mechanism portion to be rotatable, and opens and closes an upper portion of the loading surface by rotating,
wherein the reading mechanism portion includes
a reading unit which extends in a main scanning direction, and moves in an auxiliary scanning direction intersecting with the main scanning direction,
a motor which moves the reading unit, and
a first linking portion and a second linking portion which are disposed on the outside of a moving region when the moving region of the reading unit is viewed in a plan view, and are linked to the opening and closing body to be rotatable, and
wherein the motor is disposed at least in a housing of the first linking portion or a housing of the second linking portion.

* * * * *